United States Patent
Eros et al.

(10) Patent No.: US 12,549,943 B2
(45) Date of Patent: Feb. 10, 2026

(54) USING A PROXY IN FRONT OF A DIAMETER ROUTING AGENT

(71) Applicant: T-Mobile Innovations LLC, Overland Park, KS (US)

(72) Inventors: Tamas Eros, Everett, WA (US); Ying Sheng Liang, Auburn, WA (US)

(73) Assignee: T-Mobile Innovations LLC

( * ) Notice: Subject to any disclaimer, the term of this patent is extended or adjusted under 35 U.S.C. 154(b) by 281 days.

(21) Appl. No.: 18/449,704

(22) Filed: Aug. 14, 2023

(65) Prior Publication Data

US 2025/0063350 A1 Feb. 20, 2025

(51) Int. Cl.
| | |
|---|---|
| *H04W 12/06* | (2021.01) |
| *H04L 61/503* | (2022.01) |
| *H04W 12/088* | (2021.01) |
| *H04W 12/72* | (2021.01) |
| *H04W 4/60* | (2018.01) |

(52) U.S. Cl.
CPC .......... *H04W 12/06* (2013.01); *H04L 61/503* (2022.05); *H04W 12/088* (2021.01); *H04W 12/72* (2021.01); *H04W 4/60* (2018.02)

(58) Field of Classification Search
None
See application file for complete search history.

(56) References Cited

U.S. PATENT DOCUMENTS

| | | | | |
|---|---|---|---|---|
| 2013/0139241 | A1* | 5/2013 | Leeder | H04W 12/068 726/9 |
| 2018/0160292 | A1* | 6/2018 | Chastain | H04W 12/06 |
| 2018/0241615 | A1* | 8/2018 | Livanos | H04L 41/0668 |
| 2020/0267542 | A1* | 8/2020 | Pronk | H04W 12/037 |
| 2021/0058391 | A1* | 2/2021 | Graybeal | H04W 12/086 |
| 2021/0092104 | A1* | 3/2021 | Avetoom | H04L 69/40 |

\* cited by examiner

*Primary Examiner* — San Htun

(57) ABSTRACT

A system comprises a network access server, a back-end network node, and a diameter routing agent (DRA). The network access server is configured to send, to the back-end network node, attribute-value pairs (AVP) of the network access server; receive, from a communication device, an authentication request; send, to the back-end network node, a Transmission Control Protocol (TCP) request responsive to receiving the authentication request; and send the authentication request to the DRA for authenticating a subscriber identity module (SIM) card. The back-end network node is coupled to the network access server and to the DRA, wherein the back-end network node is configured to send, to the DRA, configuration information for pre-configuring the network node at the DRA, and wherein the configuration information includes an IP address of the network node. The DRA coupled to the network node and configured to pre-configure the network node based on the configuration information.

20 Claims, 9 Drawing Sheets

USING A PROXY IN FRONT OF A DIAMETER ROUTING AGENT

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Communication devices such as, for example, consumer devices and Machine-to-Machine (M2M) communication devices are widely deployed in a wireless network, such as a cellular network. Mobile devices may include a smart phone, a tablet computer, a wearable computer, or a desktop computer, while M2M devices may include Internet of Things (IoT) devices such as a thermostat, a refrigerator, a water meter, or other similar everyday IoT devices. Communication devices may access any number of cellular and Internet Protocol (IP) networks for receiving text data, voice data, video data, support services, and other similar services. Cellular networks may exchange wireless signals with mobile communication devices using wireless network protocols. Exemplary wireless network protocols include Institute of Electrical and Electronic Engineers (IEEE) 802.11 (WIFI), fourth generation (4G) Long Term Evolution (LTE), fifth generation (5G) new radio (5GNR), and Low-Power Wide Area Network (LP-WAN).

Many aspects of a user's daily activities are tied to a mobile device. For instance, a mobile device owner/user may interact with the mobile device to communicate information and/or data from the mobile device over the Internet or a wireless network. For instance, a user may use one or more digital systems of the mobile device to transmit and receive electronic mail, voice data, text messages, picture/image data, financial information, or other similar communication over the Internet. Mobile communication devices and other end-point devices may use a physical subscriber identification module (SIM) card, an Embedded Universal Integrated Circuit Card (EUICCs), also referred to as an Embedded Subscriber Identity Module (eSIM), or virtual SIMs to identify and authenticate the user to a cellular network of a mobile carrier (for example, a mobile network operator (MNO) or a mobile virtual network operator (MVNO)) in order to perform network functions such as voice, messaging, and data communications.

SUMMARY

In an embodiment, a system comprises a network access server, a network node, and a diameter routing agent (DRA). The network access server is configured to send, to a back-end network node in a first Diameter message, subscription information of the network access server, wherein the subscription information comprises attribute-value pairs (AVP) of the network access server; receive, from a communication device, an authentication request; send, to a network node, a Transmission Control Protocol (TCP) connection request in a second Diameter message responsive to receiving the authentication request; and send the authentication request in a third Diameter message to a diameter routing Agent (DRA) for authenticating a subscriber identity module (SIM) card for multimedia services of the core network. The back-end network node is coupled to the network access server and to a diameter routing agent (DRA), wherein the back-end network node is configured to send, to a diameter routing agent (DRA) in a fourth Diameter message, configuration information for pre-configuring the network node at the DRA, and wherein the configuration information includes an Internet Protocol (IP) address of the network node. The DRA is coupled to the network node and configured to pre-configure the network node based on the configuration information.

In another embodiment, a system for routing Diameter messages in a core network and for authenticating a wireless communication device according to the Diameter messages comprises at least one network access server, a firewall proxy, and a diameter routing agent (DRA). The at least one network access server is configured to send, to a firewall proxy in a first Diameter message, subscription information of the network access server, wherein the subscription information comprises attribute-value pairs (AVP) of the at least one network access server; receive, from a communication device, an authentication request; and send, to a diameter routing agent (DRA) in a second Diameter message, a Transmission Control Protocol (TCP) connection request. The firewall proxy is coupled to the at least one network access server and configured to generate an access list based on the subscription information, wherein the access list includes a mapping of a source Internet Protocol (IP) address of a corresponding network access server of the at least one network access server to a firewall network address translation (NAT) IP address of the firewall proxy; send, to the DRA in a third Diameter message, configuration information for pre-configuring the firewall proxy at the DRA, wherein the configuration information includes the firewall NAT IP address of the firewall proxy; and send, to the communication device, the access list. The DRA is coupled to the firewall proxy and configured to pre-configure the firewall proxy based on the configuration information; receive, from the at least one network access server, the Transmission Control Protocol (TCP) connection request comprising the firewall NAT IP address in a fourth Diameter message; and send, to the at least one network access server, an acknowledgement that indicates confirmation of the TCP connection request.

In yet another embodiment, a system for routing Diameter messages in a core network and for authenticating a wireless communication device according to the Diameter messages, comprises at least one network access server, a load balancer, and a diameter routing agent (DRA). The at least one network access server is configured to send, to a load balancer in a first Diameter message, subscription information of the network access server, wherein the subscription information comprises attribute-value pairs (AVP) of the at least one network access server; receive, from a communication device, an authentication request; send, to the load balancer in a second Diameter message, a Transmission Control Protocol (TCP) connection request responsive to receiving the authentication request; and send in a third Diameter message the authentication request to a diameter routing Agent (DRA) for authenticating a subscriber identity module (SIM) card of the communication device for multimedia services of the core network. The load balancer is coupled to the at least one network access server and to a diameter routing agent (DRA), wherein the load balancer is configured to send, to a diameter routing agent (DRA) in a fourth Diameter message, configuration information for pre-configuring the load balancer at the DRA. The DRA is coupled to the load balancer and configured to pre-configure the load balancer based on the configuration information.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
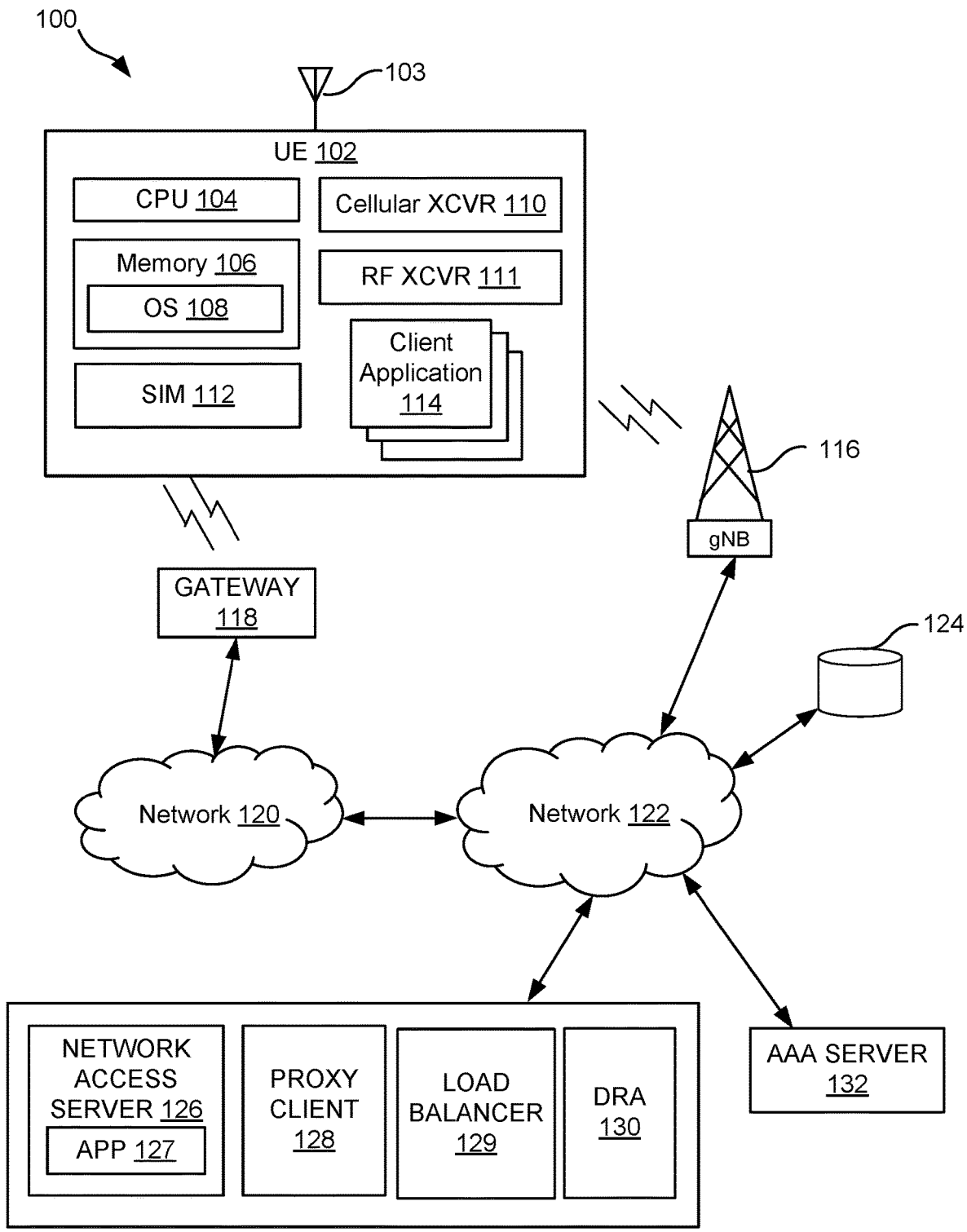
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A communication device and other end-point devices (hereinafter referred to as "communication device") are widely deployed in cellular networks. The communication device may exchange wireless signals with cellular networks using wireless network protocols. In a cellular network such as, for example, in a 4G LTE or a 5G cellular network, a base station can include a radio access network (RAN) node such as, for example, a 5G evolved or enhanced gigabit Node B (gNB). These RANs use a radio access technology (RAT) to communicate between the RAN Node and the communication device (or UE). A user subscribed to the cellular network may interact with a variety of digital systems on a communication device to transmit and/or receive electronic mail messages (email messages), voice data, short message service (SMS) data, video and/or image data, and other similar communications over the cellular network. A communication device and other end-point devices may use a SIM card (for example, a physical SIM card, an eSIM, or a virtual SIM) to identify and authenticate the communication device to the cellular network of a mobile carrier (for example, a mobile network operator (MNO) or a mobile virtual network operator (MVNO)) before authorizing the communication device to send and receive electronic communications including voice, image, video, and text information. For instance, a SIM card in the communication device requesting Internet Protocol (IP) Multimedia Services (IMS) such as, for example, voice over LTE (VoLTE), Video over LTE (ViLTE), Voice over WIFI and other Rich Communication Services (RCS) (hereinafter, WIFI services), may need to be authenticated for these services at an authentication, authorization and accounting (AAA) server of the mobile carrier in order to be enabled to use WIFI services of the cellular network.

In order to enable WIFI services at a communication device, the communication device initially connects to network access server at a 5G core network of a mobile carrier. Further, a network access server such as, for example, an entitlement server, a home subscriber server (HSS), a Mobility Management Entity (MME), a Policy and Charging Rules Function (PCRF), or a packet gateway (P-GW) may send a connection request to a diameter routing agent (DRA) server at the 5G core network for authenticating the UE at the 5G core network. In an example, the Internet Protocol (IP) address of the network access server may be pre-configured at the DRA server so that Diameter requests from the network access server that are sent to the AAA server for authenticating the communication device at the AAA for WIFI services are not rejected by the DRA server. In an example, a DRA server may be connected over a corresponding DRA server communication link with approximately 30 network access servers before additional DRA servers are needed for the 5G core network. However, as more communication devices, for example, more smart phones and IoT devices are added to the cellular network, additional network access servers are needed to support the growing number of communication devices. Each network access server that is added may have to be pre-configured to the 5G core network, which may cause inflexibility in adding more users to a rapidly growing 5G cellular network. Further, a network access server may be provisioned as a physical server or a virtual server. A physical server may be preconfigured with a fixed IP address at a DRA server. However, network access servers that are deployed as virtual servers running in a cloud computing environment may generate dynamic IP addresses each time an instance of a virtual network access server is instantiated. These dynamic IP addresses may have to be pre-configured at the DRA server otherwise Diameter requests from virtual network access servers may be denied by the DRA, which further imparts communication delays in sending and receiving communication messages between users in the cellular network. Moreover, spoofing attacks are prevalently being used to target the 5G core network and, thus, securely transmitting authentication and authorization requests through the communication path is a growing concern without imparting further communication delays in the cellular network.

As disclosed herein, a proxy client of a core network in the present application may interact with a diameter routing agent (DRA) server in order to route Diameter requests from a network access server to the DRA server. In an example, a proxy client is provisioned between the network access server and the DRA server of the 5G core network for routing Diameter messages to diameter network nodes and to the AAA server for authenticating and authorizing a SIM card for network access to AAA services of a 5G core network of a mobile operator. In an example, the network proxy client may be a firewall proxy that is provisioned between a network access server and a DRA. In an example, the firewall proxy may generate an access list that includes a mapping of source IP addresses of a network access server to a firewall NAT IP address and to a firewall proxy hostname. In an example, the firewall proxy uses a subnet mask to map each source IP address of a network access server to a firewall NAT IP address of the firewall proxy, and each origin hostname of a network access server to the firewall proxy hostname. In an example, the firewall proxy sends configuration information that includes the firewall NAT IP address and the firewall proxy hostname to the DRA for configuring the firewall proxy at the DRA server. Further, the firewall proxy may send the access list to the network access server in order for the network access servers to send AVPs with the firewall NAT IP and the firewall proxy hostname to the DRA in Diameter messages, in order to authenticate the network access servers at the DRA. TCP connection messages that are sent as Diameter messages from the network access server and which do not include a combination of the firewall NAT IP address and firewall proxy host name are not responded to by the DRA.

In an example, the proxy client may be a load balancer that sends a virtual IP address of the load balancer to a network access server in the 5G core network for use by the network access server in AVPs. In an example, the load balancer sends configuration information to the DRA server for configuring the network access server. In an example, the DRA server registers the load balancer with the virtual IP address, RAM identifier, and hostname of the load balancer in order to authenticate the load balancer that routes Diameter messages from the network access server to the DRA server. In an example, the load balancer may send a TCP connection request to a DRA server for connecting to a DRA at the back-end of the core network for authorizing communication between the DRA and one or more network access servers. In an example, the TCP connection request may include a pre-configured virtual IP address of the load balancer. In an example, the DRA server may pre-configure the load balancer, for example, the DRA server registers the load balancer with the virtual IP address, RAM identifier, and hostname of the load balancer in order to authenticate the load balancer that routes Diameter messages from the network access server to the DRA server.

The disclosure describes systems and methods that provide advantages over conventional solutions whereby only the clients (for example, the network access servers) that are mapped in the access list may be able to send communications that can be received by the DRA, which increases security in the core network over conventional methods. Further, mapping the network access servers to a subnet ensures that data from communication devices from other subnets that are not mapped to the firewall NAT IP address are rejected thereby further increasing security in communications that are received by the core network. Also, dynamic IP addresses that are generated may be assigned to the subnet, and defined by the firewall NAT IP address and which was pre-configured at the DRA server, so that Diameter requests from virtual network access servers may be passed through by the DRA. This may reduce or eliminate communication delays in sending and receiving communication messages between users in the cellular network as additional virtual network access servers may cause the core network to be scalable. Further, the disclosure described systems and methods that help to manage growth and change of the core network when virtual network access servers are provisioned in the core network as more IoT devices come online.

Turning now to FIG. 1, a communication system 100 is described according to an embodiment. In an embodiment, the communication system 100 is configured to authenticate a network access server at a core network of a mobile network operator (MNO), when a user device/user equipment requests IMS services, for example requests WIFI services of the mobile network operator using subscriber information of a SIM card of a communication device. In an example, the network access server may be an entitlement server, a home subscriber server (HSS), a Mobility Management Entity (MME), a Policy and Charging Rules Function (PCRF), or a packet gateway (P-GW). In an embodiment, the communication system 100 may comprise user device/user equipment (UE) 102, cell site 116, a gateway 118, a first communication network 120, a second communication network 122, and data storage 124. The UE 102 may be a communication device such as, for example, game console, a smart phone, a tablet computer, portable and desktop computers, a smart TV, a smart speaker, connected thermostats, home security systems, domestic robots, smart bulbs, energy monitors, a connected appliance, a smart door lock, a connected car device, or other similar everyday IoT devices that has one or more processors, memory, and transceiver components. The UE 102 may be a fixed communication device or a mobile communication device. In an embodiment, the UE 102 comprises an antenna 103, a central processing unit (CPU) 104, a memory 106 that stores an operating system (OS) 108, a cellular transceiver 110, a radio frequency (RF) transceiver 111, a SIM card 112, and one or more client applications 114.

In an embodiment, the antenna 103 may be communicatively coupled to the cellular transceiver 110, the RF transceiver 111, and client applications 114 through a wired connection. The antenna 103 may include radio frequency (RF) reception and transmission components of the UE 102, and may be communicatively coupled to the cellular transceiver 110 and the RF transceiver 111. In an embodiment, the cellular transceiver 110 may establish a radio communication link to the cell site 116 using the antenna 103. In an embodiment, the cellular transceiver 110 may establish the radio communication link to the second communication network 120 using the antenna 103. The radio communication link may be established according to an LTE protocol, a Code Division Multiple Access (CDMA) protocol, a Global System for Mobile Communications (GSM) protocol, or a 5th generation mobile network (5G) telecommunication protocol. In an embodiment, the cellular transceiver 110 includes a 5G RAT that provides an air interface for the UE 102. While not shown in FIG. 1, the cellular transceiver 110 may include additional circuit components to process and manipulate wireless signals that are received from the cell site 116 at the UE 102.

In an embodiment, the RF transceiver 111 may establish a radio communication link to the first communication network 120 via a wireless gateway 118 using the antenna 103. In an example, the first communication network 120 comprises the Internet. In an example, the communication link may be established according to a wireless network protocol that includes the IEEE 802.11 (WIFI) protocol. In an embodiment, the RF transceiver 111 includes RF circuits that provide an air interface for the UE 102. While not shown in FIG. 1, the RF transceiver 111 may include additional circuit components to process and manipulate wireless signals that are received from the gateway 118.

The memory 106 comprises a non-transitory portion that embeds one or more applications for execution by the CPU 104. In embodiments, the memory 106 embeds an operating system (OS) 108 and one or more client applications 114. In an embodiment, the OS 108 comprises executable instructions of an OS kernel of the UE 102. In an embodiment, the OS 108 may be executed to perform operations such as, for example, operations to manage input/output data requests to the UE 102 (e.g., from software and/or client applications 114), translate the requests into instructions (e.g., data processing instructions) for execution by the CPU 104 or other components of the UE 102, manage the UE 102 resources, such as the CPU 104 and the memory 106 when executing and providing services to applications on the UE 102 such as client applications 114.

In an embodiment, the UE 102 may include client applications 114 that may be configured as VoIP applications or IP messaging applications for sending and receiving video, text, and image data over an IP network such as, for example, over first communication network 120. In an example, the client applications 114 may be configured as web browser applications to access the first communication network 120 for communicating instructions and/or commands over the first communication network 120. In an example, the UE 102 may include client applications 114 that may be configured to access the second network 122 for enabling VoIP applications or IP messaging applications on the UE 102. In an example, the UE 102 or client applications 114 may receive notifications from a mobile carrier (e.g., an MNO) based on the user's activity on the client applications 114 while connected to the 5G core network (for example, using 4G/LTE or 5G protocol) of the mobile carrier. In an example, the notifications may include a text message, a voice message, a voice call, or an authentication request or response for authenticating a user associated with the client application 114 on UE 102.

The UE 102 may be communicatively coupled to first communication network 120 and to second communication network 122. In an example, the UE 102 may be wirelessly coupled to the cell site 116 for connecting the UE 102 to second communication network 122 and/or may be coupled to first communication network 120 via a wired connection or via a wireless connection via gateway 118. In an example, the second communication network 122 may be a 5G core network (for example, a macro network) of a network provider/MNO, and the first communication network 120 may be a data network such as the Internet. In an embodiment, the UE 102 may request AAA services of the second communication network 122 using the radio communication link. In examples, the communication link between the second communication network 122 and UE 102 may be established according to an LTE protocol, a CDMA protocol, a GSM protocol, or a 5G telecommunication protocol. The second communication network 122 may provide 5G services including voice, data, and messaging services to the UE 102 using virtual network functions. The system 100 may comprise additional communication networks similar to second communication network 122 and any number of cell sites 116.

The SIM 112 may be implemented, in some examples, as a removable smart card, as an embedded smart card having a smart-card chip soldered onto the motherboard of the UE 102, as a virtual SIM card or as an electronic SIM card with the SIM function being provided by software instructions in the UE 102 that, when executed by the CPU 104, provides traditional SIM card functionality and security via the virtual SIM card. As used in the present specification, the term "SIM" or "SIM card" may refer to any one of the three different forms of SIMs disclosed above.

In an example, the second communication network 122 may comprise a network access server 126, a network proxy client 128, a load balancer 129, and a DRA server 130. In an example, the network access server 126 may be configured as an entitlement server, a home subscriber server (HSS), a Mobility Management Entity (MME), a Policy and Charging Rules Function (PCRF), or a packet gateway (P-GW) of a core network for enabling communications from the UE 102 to an AAA server 132 that provide Internet Multimedia Services (IMS) such as VoLTE, ViLTE, VoWiFi, or preferred roaming selection for a subscriber associated with SIM 112. In an example, authentication, authorization, and accounting information of the user may be stored in database 124.

In an example, the network access server 126 may push IMS service updates to SIM 112 and/or orchestrate eSIM enabled wearable device pairing for SIM 112 on UE 102. In an example, the network access server 126 may include one or more applications 127 (for example, software) for sending Diameter requests to one or more network nodes of the core network when authenticating the SIM 112 for AAA services of the core network. In an example, the network access server 126 may send communications to one or more of a network proxy client 128, a load balancer 129, and a DRA 130. In an example, the network access server 126 may generate Diameter messages to request authentication, authorization, and accounting services for the user associated with the SIM 112 of the UE 102. In an example, the network proxy client 128 may be configured as a firewall proxy for routing Diameter requests from the network access server 126 to the DRA 130. In an example, the Diameter request may be based on a mapping of source IP addresses of the network access server 126 to a firewall network address translation (NAT) IP address of the network proxy client 128. As used herein, the mapping associates each source IP address of a network access server with the firewall NAT IP address of the firewall proxy. In an example, the load balancer 129 is coupled to the network access server 126 and directs network traffic from the network access server 126 to a group of DRA 130 and other service requests to the AAA server 132.

In an example, the incoming network traffic is distributed over DRA's similar to DRA 130 in order to balance the overall workload of the 5G core network. In an example, the DRA 130 forward and routes Diameter messages from the network access server 126 to nodes in the 5G core network and/or to the AAA server 132. In an example, the second communication network 122 may be communicatively coupled to AAA server 132 for authenticating the UE 102 for IMS services of the second communication network 120. In an example, the AAA server 132 may determine whether the SIM 112 is authorized as a subscriber of the mobile operator of the second communication network 122 and the type of network access such as, for example, network access for VoLTE, ViLTE, or VoWiFi on the second communication network. In an embodiment, the AAA server 132 may authenticate the UE 102 for AAA services of a 5G core network using a network slice-specific authentication and authorization method. In an example, the specialized network slice defines one or more virtualized network functions (VNFs) for providing registration, security, connection, and authentication and authorization of the UE 102 to the 5G core network. The system 100 may comprise additional communication networks similar to the second communication network 122 and any number of cell sites 116.

Figure 2A:
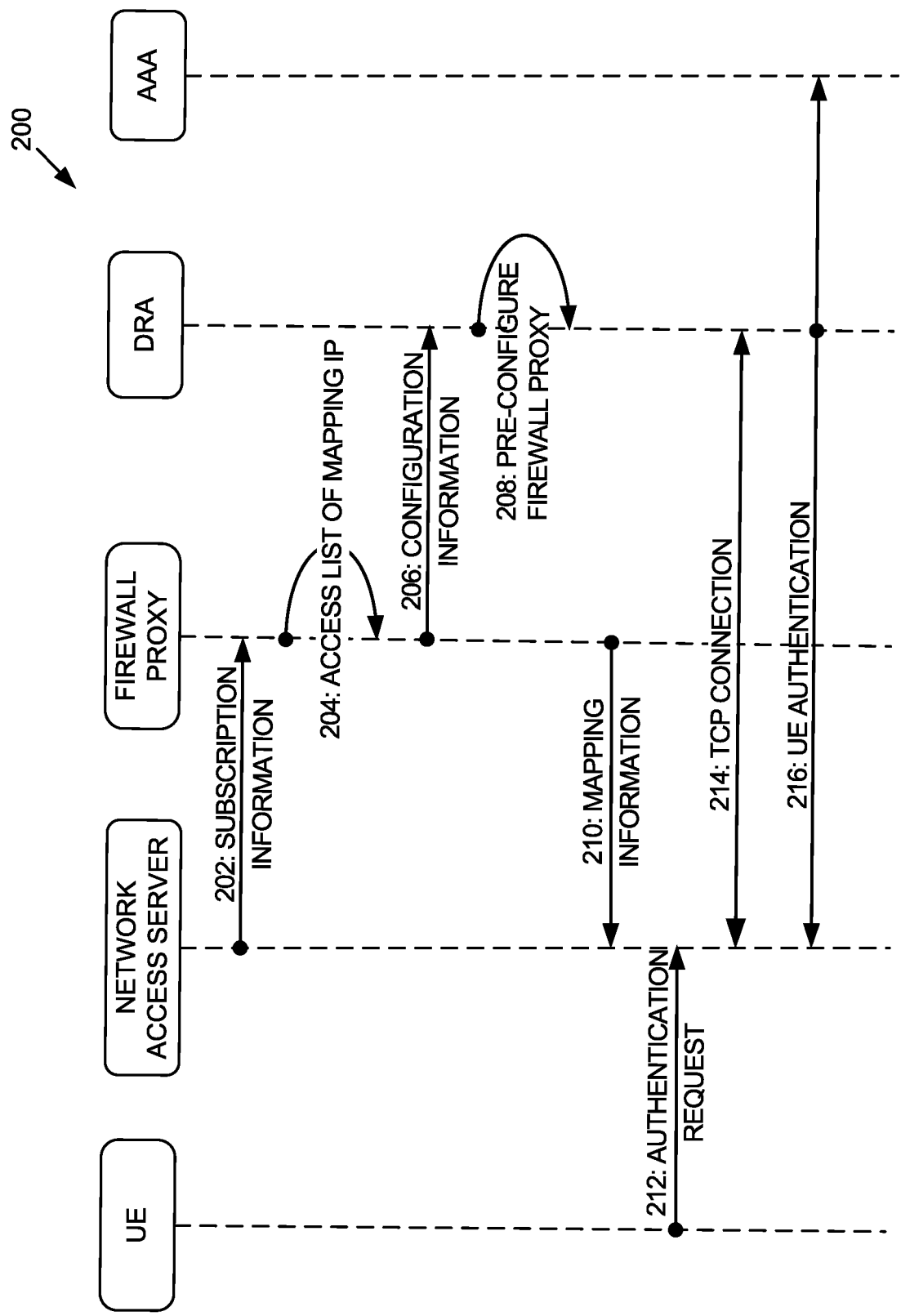
FIG. 2A is a data flow diagram of a method according to an embodiment of the disclosure.

Turning now to FIG. 2A, and with continued reference to FIG. 1, a data flow diagram 200 is described according to an embodiment. In an embodiment, the data flow diagram 200 illustrates a method that uses a firewall proxy as a proxy client in the 5G core network of a mobile operator for routing Diameter requests from a network access server to a DRA server. In an example, the Diameter requests may be based on a mapping of source IP addresses of a network access server to a firewall network address translation (NAT) IP address of a firewall proxy. In an example, the firewall proxy is provisioned between the network access server and the DRA server of the 5G core network for routing Diameter messages to diameter network nodes and to the AAA server for authenticating and authorizing a SIM card for network access to AAA services of a 5G core network of a mobile operator. In an example, the firewall proxy may be used to route Diameter messages (for example, Diameter requests between a network access server and a DRA server) to the AAA server via one or more DRA servers. In an example, authorizing the network access to AAA services may include authorizing and authenticating a SIM card for access to Internet Protocol (IP) Multimedia Services (IMS) of the 5G core network. In examples and with reference to FIG. 1, the UE may be UE 102, the network access server may be the network access server 126, the firewall proxy may be the network proxy client 128, and the DRA server may be DRA server 130. While the data flow diagram 200 is shown and described with a network access server communicating with a DRA server via the firewall proxy, the data flow diagram 200 may implement the method with multiple network access servers and multiple DRA servers. The diameter request may be based on a mapping of source IP addresses of the entitlements systems to a firewall NAT IP address of the firewall proxy At step 202, a network access server sends subscription information of a network access server to a firewall proxy in the 5G core network. In examples, the subscription information may be a Diameter message that include attribute-value pairs (AVP) of the network access server. In an example, the AVP is a method of encapsulating information relevant to the Diameter message for communication network traffic based on a Diameter protocol. In an example, the AVP may include a source IP address (for example, an IP v4 or IP v6 address) of the network access server, a source hostname (for example, a computer name or a site name) of the network access server, and a realm/domain of the network access server. In an example, the network access server may send the subscription information to the firewall proxy as part of an onboarding process for registering the network access server at the DRA server.

At step 204, the firewall proxy generates an access list that includes a mapping of source IP addresses to a firewall NAT IP address. In an example, the firewall proxy maps each source IP address of a network access server to a firewall NAT IP address of the firewall proxy, and each origin hostname of a network access server to a firewall proxy hostname. In an example, the access list may also map the source IP address of a network access server to a destination IP address of a DRA server for routing Diameter messages from the network access server to a specific DRA server. In an example, the firewall proxy may apply a subnet mask to the source IP address of one or more network access servers for the same subnet in order to obtain a network IP address of network access servers that belong the subnetwork (for example, 192.0.2.0/24 or 192.0.3.0/32) and host identifiers (e.g., device addresses) for network access servers in the subnet. In an example, the firewall proxy may apply a subnet mask to the source IP addresses of virtual network access servers that are instantiated to obtain a firewall NAT IP address that represents the network address of the subnet. In an example, the virtual network servers may be grouped to a subnet for a particular DRA server according to a capacity of the DRA server. In an example, additional network access servers may be instantiated and grouped to other subnets as more network access servers are needed for a DRA and communication links for a DRA has exceed the capacity of the DRA. In an example, the subnet mask may be applied to the network group in order to obtain the firewall NAT IP address that defines a common network IP address for the subnet and a host identifier to identify each node (e.g., network access server) in the subnet. In an example, the network IP address of the subnet may be used as the firewall NAT IP address of the firewall proxy and may be mapped to the source IP addresses of the network access server. In an example, the firewall proxy defines an access list that includes a map of each source IP address of a network access server to the firewall Nat IP address. In an example, the host identifier for each network access server (for example, the origin hostname) may be assigned a firewall hostname. In an example, the access list may also include a destination IP address of a DRA server (for example, a peer node in a transmission path from the firewall proxy to the AAA server) assigned to the firewall NAT IP address.

At step 206, the firewall proxy sends configuration information to the DRA server for configuring the firewall proxy. In an example, the configuration information includes the firewall NAT IP address and the firewall proxy hostname that is used to configure the firewall proxy at the DRA server. In an example, the firewall proxy sends the configuration information as AVPs in a Diameter message.

At step 208, the DRA server pre-configures the firewall proxy with the configuration information. In an example, the DRA server registers the firewall proxy with the firewall NAT IP address and firewall proxy hostname at the DRA server in order to configure the firewall proxy at the DRA. In an example, by configuring the firewall proxy with the firewall NAT IP address at the DRA, as additional network access servers are instantiated with virtual IP addresses at the core network, these new instances of network access servers may be authenticated using the mapping of the firewall NAT IP address to a subnet described above. As such, the when the network access server transmits and/or retransmits Diameter messages, having the firewall NAT IP address and hostname that is pre-configured at the DRA, to the DRA, these Diameter messages may be passed through the DRA. In an example, configuring the firewall proxy may include maintaining the firewall Nat IP address and firewall proxy hostname in an access list that is associated with DRA server.

At step 210, the firewall proxy sends the mapping information to a network access server. In an example, the firewall proxy sends the access list comprising the mapping information to each network access server that is mapped to a firewall NAT IP address so that Diameter messages from the network access server to the DRA may include the firewall NAT IP. In an example, the firewall proxy sends the access list including source IP addresses of network access servers that are mapped to firewall NAT IP addresses. In an example, using the firewall NAT IP address in Diameter messages from the network access server increases security in the core network, because only the clients (for example, the network access servers) that are mapped in the access list may be able to send communications that can be received by the DRA.

At step 212, a network access server receives an authentication request from a UE. In an example, the authentication request may be received by the network access server for authenticating a SIM card of the UE and/or authorizing network access to AAA services of a 5G core network of a mobile operator. In an example, the authentication request may be sent to a network access server that is instantiated by the 5G core network when the 5G core network receives the authentication request from the UE.

At step 214, a network access server sends a Transmission Control Protocol (TCP) connection request to the DRA server. In an example, the TCP connection request is a Diameter message that includes the firewall NAT IP address of the firewall proxy that was preconfigured at the DRA server during the onboarding process of the network access server at the DRA. In an example, when the network access server starts for the first time (for example, when a virtual network access server is instantiated), the network access server may send a Diameter request in order to establish a TCP connection via a TCP 3-way handshake with the DRA server. In an example, the network access server may include AVP parameters that include the mapping information of the firewall NAT IP address of the network access server that is attempting to establish the TCP connection via a TCP 3-way handshake with the DRA server. In examples, the AVP in the Diameter request may include a firewall NAT IP address that is mapped to the source IP address of the network access server, the realm of the network access server, the firewall proxy hostname, and the destination IP address of the DRA server. In an example, the DRA server associated with the destination IP address may reply with a Diameter answer indicating a successful TCP connection request, and may include an acknowledgment that the network access server is registered at the DRA server. In an example, the network access server may respond with a Diameter answer that may indicate the network access server acknowledges the response from the DRA server. In an example, the DRA server may not respond to the network access server when the IP address, realm, and hostname combination is not found at the DRA server.

At step 216, the network access server sends an authentication request of the UE to the AAA server via a DRA server. In an example, the network access server may use Diameter signaling to send a Diameter request having AVP parameters to the AAA server via the DRA server for authenticating the UE at the AAA and for authorizing IMS for the SIM card on the UE. In an example, the DRA server acts as a gateway for the network access server and routes the authentication request to the AAA server. In an example, the Diameter request may include AVP including an International Mobile Subscriber Identity (IMSI) of the user and the subscriber's secret key for performing authentication and authorization of the UE device. In an example, once authenticated to the 5G core network, the UE device may receive controlled access to the 5G core network for communicating text data, voice data, video data, support services, and other similar services over WIFI between the UE device and the 5G core network as determined by the AAA.

Figure 2B:
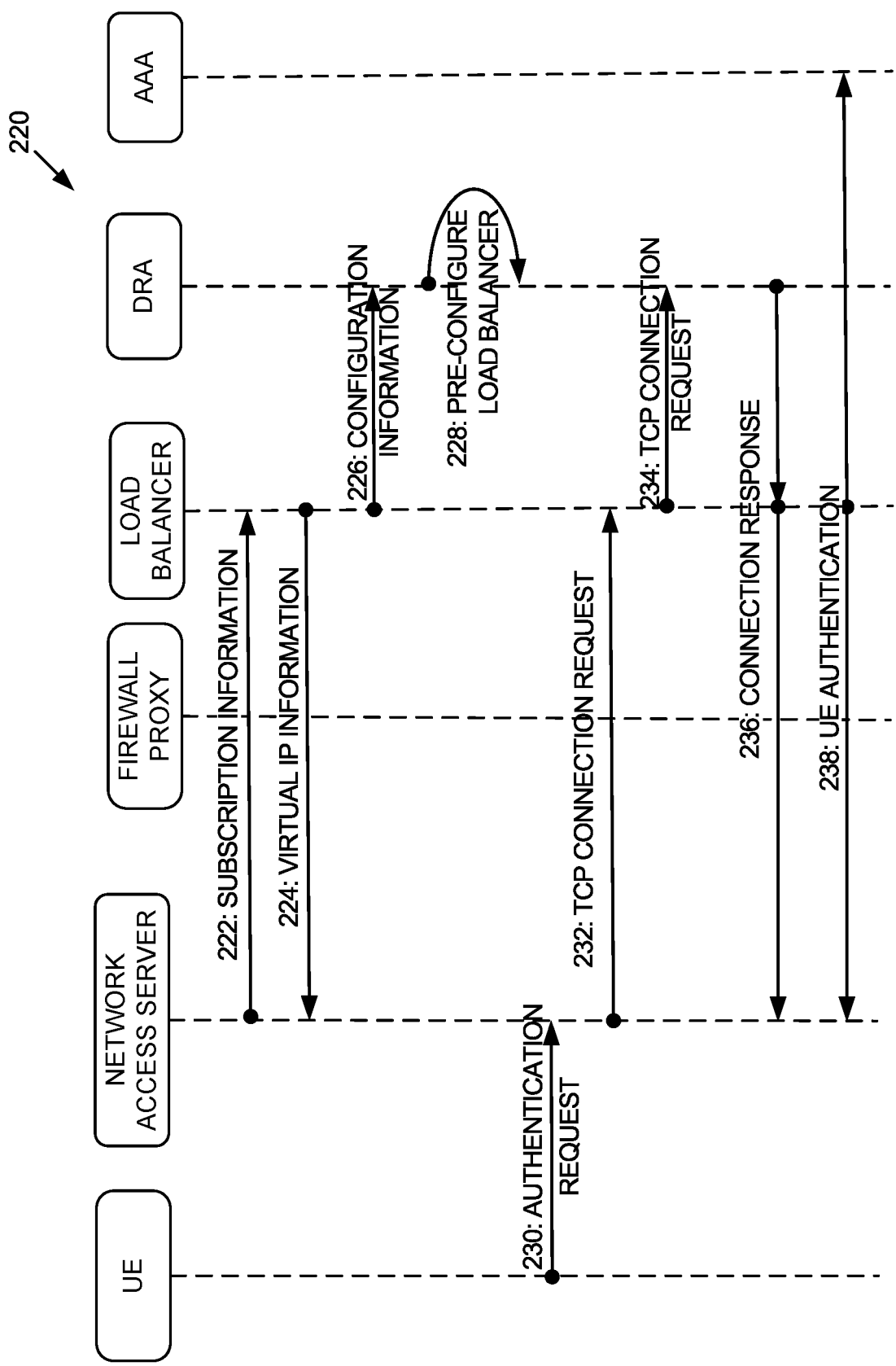
FIG. 2B is a data flow diagram of a method according to an embodiment of the disclosure.

Referring now to FIG. 2B, a diagram 220 is described according to an embodiment. In an embodiment, the data flow diagram 220 illustrates a method that is substantially similar to diagram 200 in FIG. 2A, however, diagram 220 includes a load balancer that is provisioned between the firewall proxy and the DRA server in a 5G core network of a mobile operator for routing Diameter requests from a network access server to a DRA server via a load balancer. In an example, the Diameter request may be based on virtual IP addresses of load balancer, hostname of the network access server, and random access memory (RAM) identifier of the network access server.

At step 222, a network access server sends subscription information of the network access server to a load balancer in the 5G core network. In examples, the subscription information may be a Diameter message that includes attribute-value pairs (AVP) of the network access server. In examples, the AVP may include a source hostname (for example, a computer name or a site name) of the network access server, a realm/domain of the network access server, and a RAM identifier for a physical or virtual network access server (for example, hardware identifier of the RAM for the network access server). In an example, the network access server may send the subscription information to the DRA server as part of an onboarding process for registering the network access server at the DRA server.

At step 224, the load balancer sends a virtual IP address of the load balancer to a network access server in the 5G core network for use by the network access server in AVPs. In examples, multiple servers of the load balancer may be represented by the virtual IP (VIP) address that is sent to the network access server that may be used as AVP in Diameter messages that are received by the DRA server from the network access server via the load balancer.

At step 226, the load balancer sends configuration information to the DRA server for configuring the network access server. In examples, the load balancer sends the VIP address of each load balancer, RAM identifier of each network access server, and hostname of the load balancer to the DRA server to register/configure the load balancer at the DRA server.

At step 228, the DRA server configures the load balancer with the received configuration information. In an example, the DRA server registers the load balancer with the virtual IP address, RAM identifier, and hostname of the load balancer in order to authenticate the load balancer that routes Diameter messages from the network access server to the DRA server.

At step 230, a network access server receives an authentication request from a UE. In an example, the authentication request may be received by a network access server for authenticating a SIM card of the UE and/or authorizing network access to AAA services of a 5G core network of a mobile operator. In an example, the authentication request may be sent to a network access server that is instantiated by the 5G core network when the 5G core network receives the authentication request from the UE.

At step 232, the load balancer receives a TCP connection request from the network access server. In an example, the load balancer receives a first TCP connection request as a Diameter request that may include the source IP address of the network access server, the destination IP address as the VIP address of the load balancer, and a RAM identifier. In an example, the first TCP connection request is for connecting to the load balancer.

At step 234, the load balancer sends a second TCP connection request to the DRA. In an example, the load balancer may send a TCP connection request to a DRA server upon receiving the first TCP connection request from the network access server. In an example, the second TCP connection request may be used to connect to a DRA at the back-end of the core network for authorizing communication between the DRA and one or more network access servers. In an example, the load balancer may distribute the second TCP connection request according to application workload of a DRA server at the back-end, and health management of the DRA server. In an example, the load balancer may perform health checks on DRA servers by periodically transmitting health check messages to the DRA servers at the back end. In an example, the load balancer may "black hole" traffic (also referred to as non-routable traffic) to a DRA server that does not respond and/or route the authentication request to a responsive DRA server in the same service group as the non-responsive DRA.

At step 236, the DRA server may reply with a response indicating a successful connection request, which may include an acknowledgment that the load balancer is registered at the DRA server when the VIP address, realm, and hostname combination is found at the DRA server. In an example, the load balancer may further send the acknowledgement to the network access server. In an example, the network access server may respond with a Diameter answer that indicates the network access server acknowledges the response from the load balancer. In an example, the DRA server may not respond to the load balancer with a Diameter answer when the VIP address, realm, and hostname combination is not found at the DRA server.

At step 238, the network access server sends an authentication request of the UE to the DRA server via the load balancer. In an example, the network access server may use Diameter protocol to send a Diameter request having AVP parameters to the DRA server via the load balancer for authenticating the UE at the AAA. In an example, the load balancer acts as a gateway for the network access server and routes the authentication request to a DRA server. In an example, the network access server and the firewall may be in the same security group and may allow traffic from the network access server to pass through the firewall on to the load balancer. In an example, additional Diameter requests may be sent by the network access server that may include user credentials including an International Mobile Subscriber Identity (IMSI) of the user and the subscriber's secret key for authenticating the UE for IMS services and billing the user for authorizing IMS services on the UE. In an example, once authenticated to the 5G core network, the UE device may receive controlled access to the 5G core network for communicating text data, voice data, video data, support services, and other similar services over WIFI between the UE device and the 5G core network as determined by the AAA.

Figure 3:
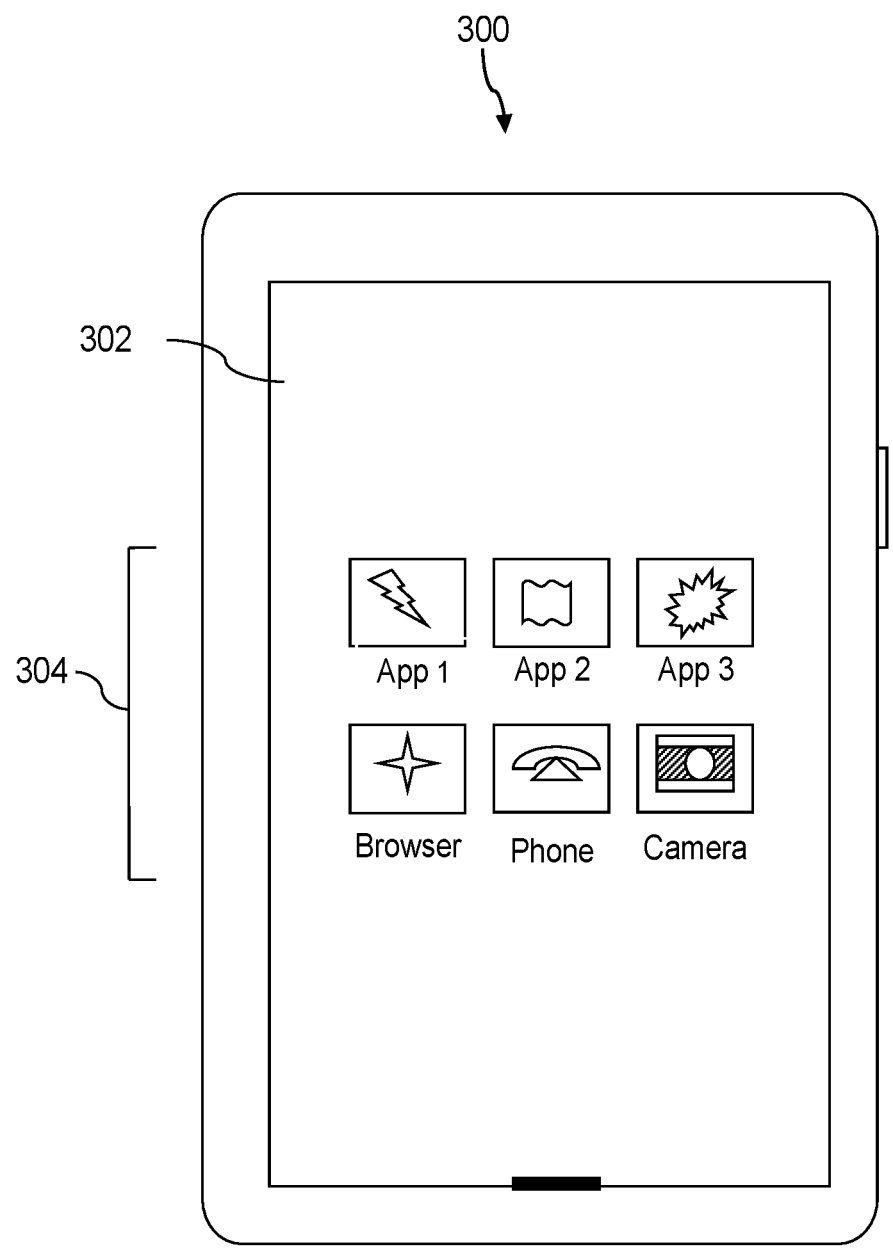
FIG. 3 is an illustration of a communication device according to an embodiment of the disclosure.

FIG. 3 depicts user equipment (UE) 300, which is operable for implementing aspects of the present disclosure, but the present disclosure should not be limited to these implementations. Though illustrated as a communication device, the UE 300 may take various forms including a smart vehicle, a smart appliance (for example, a smart refrigerator), a smart phone, a wearable computer, a personal digital assistant (PDA), a headset computer, a laptop computer, a notebook computer, and a tablet computer.

The UE 300 includes a touchscreen display 302 having a touch-sensitive surface for input by a user. A small number of application icons 304 are illustrated within the touch screen display 302. It is understood that in different embodiments, any number of application icons 304 may be presented in the touch screen display 302. In some embodiments of the UE 300, a user may be able to download and install additional applications on the UE 300, and an icon associated with such downloaded and installed applications may be added to the touch screen display 302 or to an alternative screen. The UE 300 may have other components such as electro-mechanical switches, speakers, camera lenses, microphones, input and/or output connectors, and other components as are well known in the art. The UE 300 may present options for the user to select, controls for the user to actuate, and/or cursors or other indicators for the user to direct. The UE 300 may further accept data entry from the user, including numbers to dial or various parameter values for configuring the operation of the handset. The UE 300 may further execute one or more software or firmware applications in response to user commands. These applications may configure the UE 300 to perform various customized functions in response to user interaction. Additionally, the UE 300 may be programmed and/or configured over-the-air, for example from a wireless base station, a wireless access point, or a peer UE 300. The UE 300 may execute a web browser application which enables the touch screen display 302 to show a web page. The web page may be obtained via wireless communications with a base transceiver station, a wireless network access node, a peer UE 300 or any other wireless communication network or system.

Figure 4:
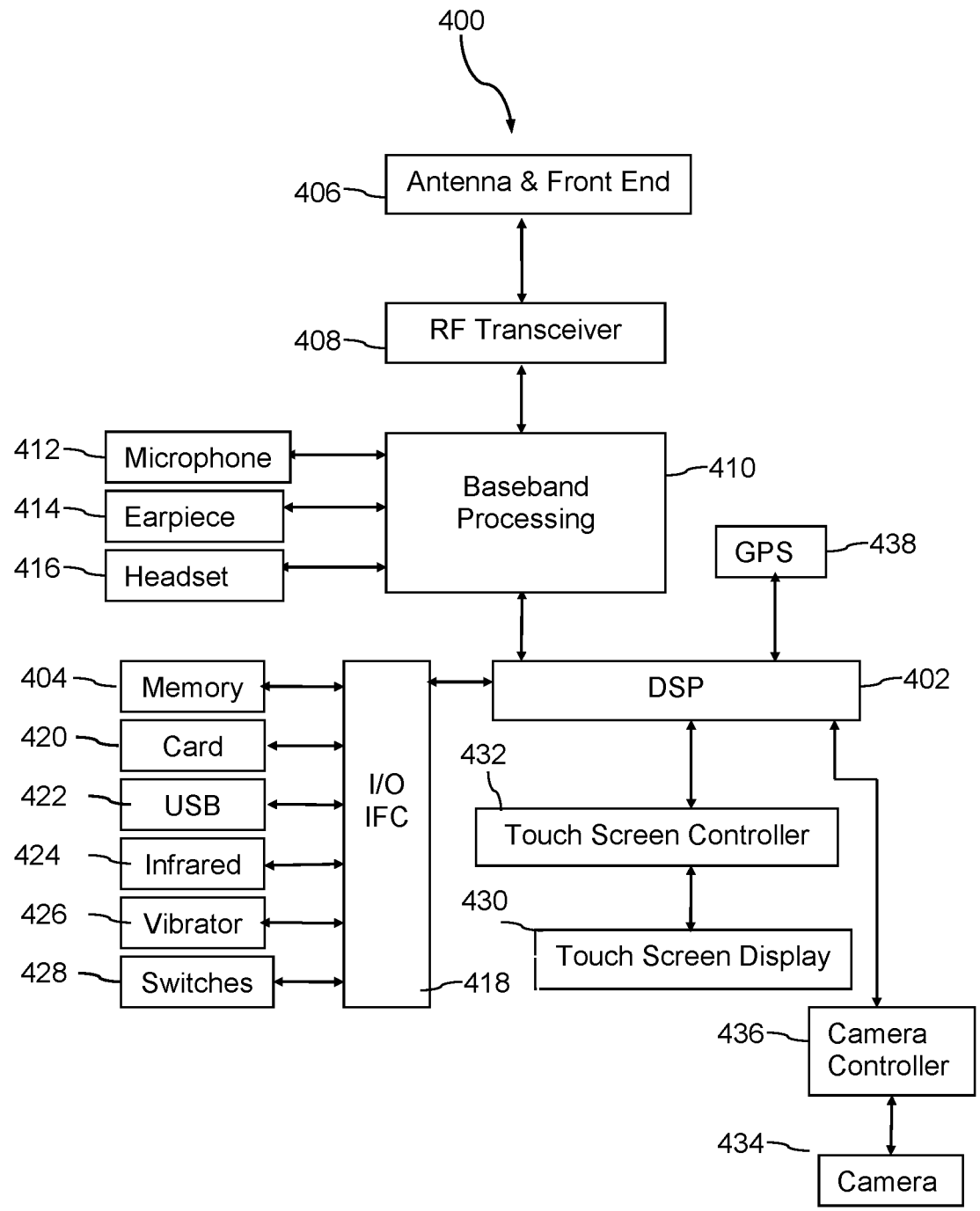
FIG. 4 is a block diagram of a hardware architecture of a communication device according to an embodiment of the disclosure.

FIG. 4 shows a block diagram of the UE 400. While a variety of known components of a communication device are depicted, in an embodiment a subset of the listed components and/or additional components not listed may be included in the UE 400. The UE 400 includes a digital signal processor (DSP) 402 and a memory 404. As shown, the UE 400 may further include one or more antenna and front end unit 406, a one or more radio frequency (RF) transceiver 408, a baseband processing unit 410, a microphone 412, an earpiece speaker 414, a headset port 416, an input/output (I/O) interface 418, a removable memory card 420, a universal serial bus (USB) port 422, an infrared port 424, a vibrator 426, one or more electro-mechanical switches 428, a touch screen display 430, a touch screen controller 432, a camera 434, a camera controller 436, and a global positioning system (GPS) receiver 438. In an embodiment, the UE 400 may include another kind of display that does not provide a touch sensitive screen. In an embodiment, the UE 400 may include both the touch screen display 430 and additional display component that does not provide a touch sensitive screen. In an embodiment, the DSP 402 may communicate directly with the memory 404 without passing through the input/output interface 418. Additionally, in an embodiment, the UE 400 may comprise other peripheral devices that provide other functionality.

The DSP 402 or some other form of controller or central processing unit operates to control the various components of the UE 400 in accordance with embedded software or firmware stored in memory 404 or stored in memory contained within the DSP 402 itself. In addition to the embedded software or firmware, the DSP 402 may execute other applications stored in the memory 404 or made available via information carrier media such as portable data storage media like the removable memory card 420 or via wired or wireless network communications. The application software may comprise a compiled set of machine-readable instructions that configure the DSP 402 to provide the desired functionality, or the application software may be high-level software instructions to be processed by an interpreter or compiler to indirectly configure the DSP 402.

The DSP 402 may communicate with a wireless network via the analog baseband processing unit 410. In some embodiments, the communication may provide Internet connectivity, enabling a user to gain access to content on the Internet and to send and receive e-mail or text messages. The input/output interface 418 interconnects the DSP 402 and various memories and interfaces. The memory 404 and the removable memory card 420 may provide software and data to configure the operation of the DSP 402. Among the interfaces may be the USB port 422 and the infrared port 424. The USB port 422 may enable the UE 400 to function as a peripheral device to exchange information with a personal computer or other computer system. The infrared port 424 and other optional ports such as a Bluetooth® interface or an IEEE 802.11 compliant wireless interface may enable the UE 400 to communicate wirelessly with other nearby handsets and/or wireless base stations.

In an embodiment, one or more of the radio transceivers is a cellular radio transceiver. A cellular radio transceiver promotes establishing a wireless communication link with a cell site according to one or more of a 5G, an LTE protocol, a CDMA protocol, a GSM protocol. In an embodiment, one of the radio transceivers 408 may comprise a near field communication (NFC) transceiver. The NFC transceiver may be used to complete payment transactions with point-of-sale terminals or other communication exchanges. In an embodiment, each of the different radio transceivers 408 may be coupled to its own separate antenna. In an embodiment, the UE 400 may comprise a radio frequency identify (RFID) reader and/or writer device.

The switches 428 may couple to the DSP 402 via the input/output interface 418 to provide one mechanism for the user to provide input to the UE 400. Alternatively, one or more of the switches 428 may be coupled to a motherboard of the UE 400 and/or to components of the UE 400 via a different path (e.g., not via the input/output interface 418), for example coupled to a power control circuit (power button) of the UE 400. The touch screen display 430 is another input mechanism, which further displays text and/or graphics to the user. The touch screen LCD controller 432 couples the DSP 402 to the touch screen display 430. The GPS receiver 438 is coupled to the DSP 402 to decode global positioning system signals, thereby enabling the UE 400 to determine its position. In an embodiment, the UE 400 is the UE 102 of FIG. 1 that may include a smart high-science appliance such as a smart vehicle, a smart appliance (for example, a smart refrigerator), a smart phone, a wearable computer, a personal digital assistant (PDA), a headset computer, a laptop computer, a notebook computer, and a tablet computer.

Figure 5:
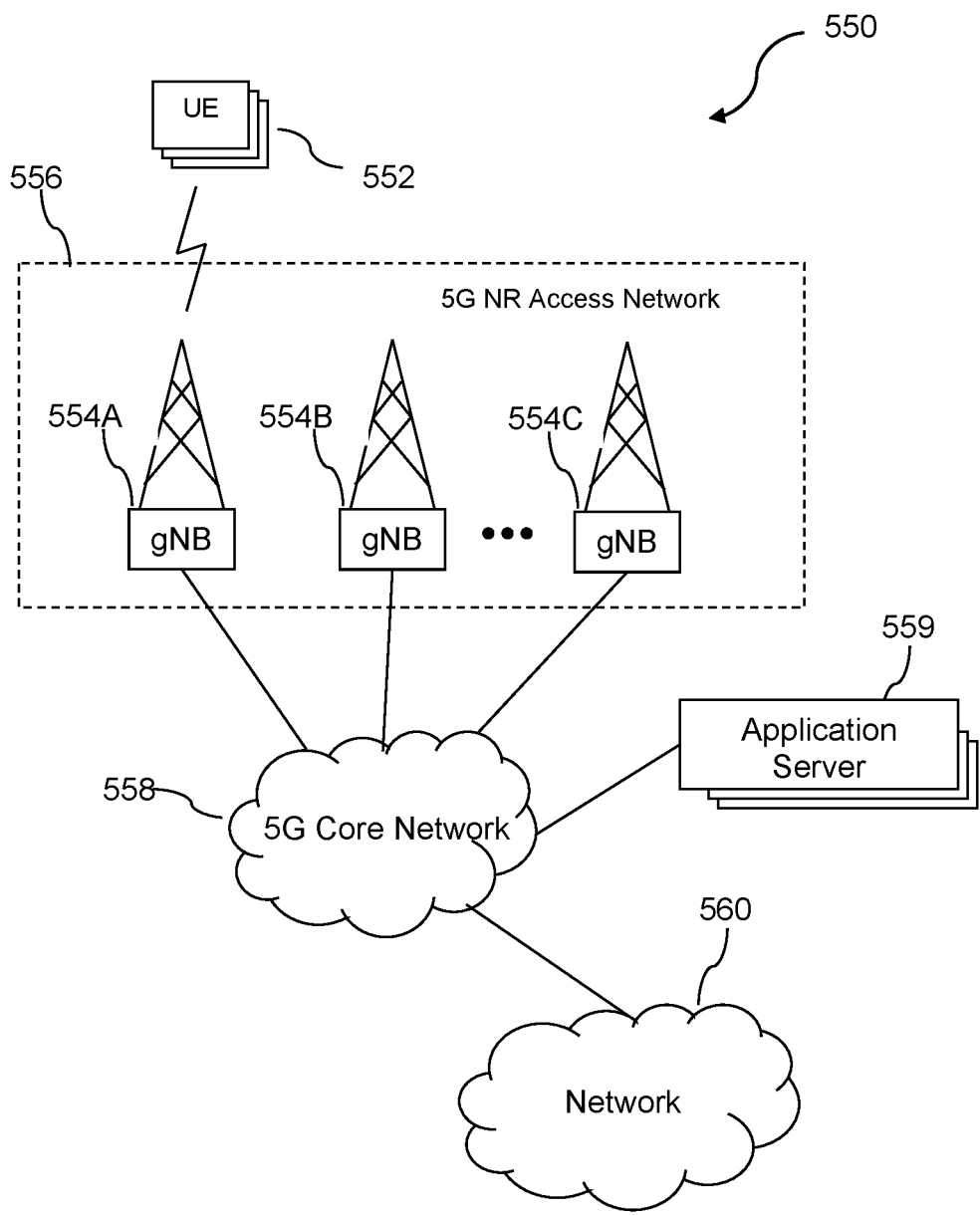
FIG. 5 is a block diagram of a communication system according to an embodiment of the disclosure.

Turning now to FIG. 5, an exemplary communication system 550 is described. Parts of the communication network 122 described above with reference to FIG. 1 may be implemented substantially like the communication system 550 described in FIG. 5 and FIG. 6. Typically, the communication system 550 includes a number of access nodes 554A-554C that are configured to provide coverage in which UEs 552 such as cell phones, tablet computers, machine-type-communication devices, tracking devices, embedded wireless modules, and/or other wirelessly equipped communication devices (whether or not user operated), can operate. The UE 552 may be the UE 102 that operate with the 5G communication network 122 (FIG. 1). The access nodes 554A-554C may be said to establish an access network 556. The access network 556 may be referred to as a radio access network (RAN) in some contexts. In a 5G technology generation, an access node 554A-554C may be referred to as a gigabit Node B (gNB). In 4G technology (e.g., long term evolution (LTE) technology) an access node 554A-554C may be referred to as an enhanced Node B (eNB). In 3G technology (e.g., code division multiple access (CDMA) and global system for mobile communication (GSM)) an access node 554A-554C may be referred to as a base transceiver station (BTS) combined with a basic station controller (BSC). In some contexts, the access node 554A-554C may be referred to as a cell site or a cell tower. In some implementations, a picocell may provide some of the functionality of an access node 554A-554C, albeit with a constrained coverage area. Each of these different embodiments of an access node 554A-554C may be considered to provide roughly similar functions in the different technology generations.

In an embodiment, the access network 556 comprises a first access node 554A, a second access node 554B, and a third access node 554C. It is understood that the access network 556 may include any number of access nodes 554A-554C. Further, each access node 554A-554C could be coupled with a 5G core network 558 that provides connectivity with various application servers 559 and/or a network 560. In an embodiment, at least some of the application servers 559 may be located close to the network edge (e.g., geographically close to the UE 552 and the end user) to deliver so-called "edge computing." The network 560 may be one or more private networks, one or more public networks, or a combination thereof. The network 560 may comprise the public switched telephone network (PSTN). The network 560 may comprise the Internet. With this arrangement, a UE 552 within coverage of the access network 556 could engage in air-interface communication with an access node 554A-554C and could thereby communicate via the access node 554A-554C with various application servers and other entities. In another embodiment, the sub-systems may communicate via the access nodes 554A-554C.

The communication system 550 could operate in accordance with a particular RAT, with communications from an access node 554A-554C to UEs 552 defining a downlink or forward link and communications from the UEs 552 to the access node 554A-554C defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"-such as LTE, which now facilitates mobile broadband service using technologies such as orthogonal frequency division multiplexing (OFDM) and multiple input multiple output (MIMO).

Recently, the industry has been exploring developments in "5G" and particularly "5G NR" (5G New Radio), which may use a scalable OFDM air interface, advanced channel coding, massive MIMO, beamforming, mobile millimeter wave (mmWave) (e.g., frequency bands above 24 Gigahertz (GHz)), and/or other features, to support higher data rates and countless applications, such as mission-critical services, enhanced mobile broadband, and massive Internet of Things (IoT). 5G is hoped to provide virtually unlimited bandwidth on demand, for example providing access on demand to as much as 20 gigabits per second (Gbps) downlink data throughput and as much as 10 Gbps uplink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IoT) and machine to machine areas.

In accordance with the RAT, each access node 554A-554C could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in an RF spectrum) having a bandwidth and a center frequency and thus extending from a low-end frequency to a high-end frequency. Further, on the downlink and uplink channels, the coverage of each access node 554 could define an air interface configured in a specific manner to define physical resources for carrying information wirelessly between the access node 554A-554C and UEs 552.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 552.

In addition, certain resource elements on the example air interface could be reserved for special purposes. For instance, on the downlink, certain resource elements could be reserved to carry synchronization signals that UEs 552 could detect as an indication of the presence of coverage and to establish frame timing, other resource elements could be reserved to carry a reference signal that UEs 552 could measure in order to determine coverage strength, and still other resource elements could be reserved to carry other control signaling such as PRB-scheduling directives and acknowledgement messaging from the access node 554A-554C to served UEs 552. And on the uplink, certain resource elements could be reserved to carry random access signaling from UEs 552 to the access node 554A-554C, and other resource elements could be reserved to carry other control signaling such as PRB-scheduling requests and acknowledgement signaling from UEs 552 to the access node 554A-554C.

The access node 554A-554C, in some instances, may be split functionally into a radio unit (RU), a distributed unit (DU), and a central unit (CU) where each of the RU, DU, and CU have distinctive roles to play in the access network 556. The RU provides radio functions. The DU provides L1 and L2 real-time scheduling functions; and the CU provides higher L2 and L3 non-real time scheduling. This split supports flexibility in deploying the DU and CU. The CU may be hosted in a regional cloud data center. The DU may be co-located with the RU, or the DU may be hosted in an edge cloud data center. The Cu may be hosted in user equipment.

Figure 6:
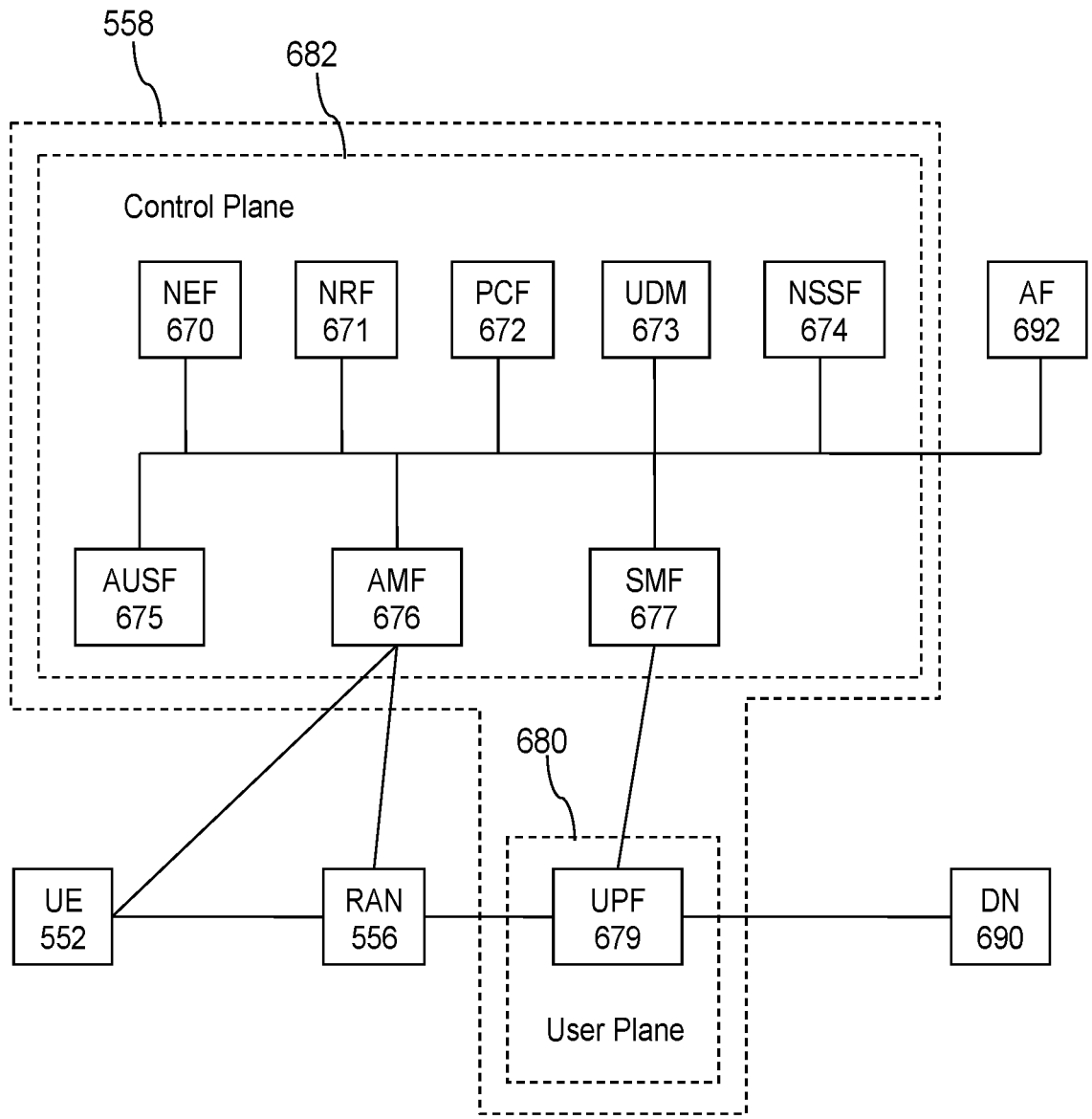
FIG. 6 is a block diagram of a core network of a communication system according to an embodiment of the disclosure.

Turning now to FIG. 6, further details of the core network 558 are described. In an embodiment, the core network 558 is a 5G core network. In an embodiment, the core network 558 may be constructed on the communication network 122 (FIG. 1). 5G core network technology is based on a service-based architecture paradigm. Rather than constructing the 5G core network as a series of special purpose communication nodes (e.g., an HSS node, an MME node, etc.) running on dedicated server computers, the 5G core network is provided as a set of services or network functions. These services or network functions can be executed in a private domain environment which supports dynamic scaling and avoidance of long-term capital expenditures (fees for use may substitute for capital expenditures). In an embodiment, these services or network functions may be executed on user equipment such as, for example, executed on the UE 102 of FIG. 1. These network functions can include, for example, a user plane function (UPF) 679, an authentication server function (AUSF) 675, an access and mobility management function (AMF) 676, a session management function (SMF) 677, a network exposure function (NEF) 670, a network repository function (NRF) 671, a policy control function (PCF) 672, a unified data management (UDM) 673, a network slice selection function (NSSF) 674, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 558 may be segregated into a user plane 680 and a control plane 682, thereby promoting independent scalability, evolution, and flexible deployment.

The UPF 679 delivers packet processing and links the UE 552, via the access node 556, to a data network 690 (e.g., the network 560 illustrated in FIG. 5 or the communication network 118 in FIG. 1). As discussed above, the UE 552 may be the UE 102 that operates with the 5G communication network 122 (FIG. 1). The AMF 676 handles registration and connection management of non-access stratum (NAS) signaling with the UE 552. Said in other words, the AMF 676 manages UE registration and mobility issues. The AMF 676 manages reachability of the UEs 552 as well as various security issues. The SMF 677 handles session management issues. Specifically, the SMF 677 creates, updates, and removes (destroys) protocol data unit (PDU) sessions and manages the session context within the UPF 679. The SMF 677 decouples other control plane functions from user plane functions by performing dynamic host configuration protocol (DHCP) functions and IP address management functions. The AUSF 675 facilitates security processes.

The NEF 670 securely exposes the services and capabilities provided by network functions. The NRF 671 supports service registration by network functions and discovery of network functions by other network functions. The PCF 672 supports policy control decisions and flow-based charging control. The UDM 673 manages network user data and can be paired with a user data repository (UDR) that stores user data such as customer profile information, customer authentication number, and encryption keys for the information. An application function 692, which may be located outside of the core network 558, exposes the application layer for interacting with the core network 558. In an embodiment, the application function 692 may be execute on an application server 559 located geographically proximate to the UE 552 in an "edge computing" deployment mode. The core network 558 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 674 can help the AMF 676 to select the network slice instance (NSI) for use with the UE 552.

Figure 7:
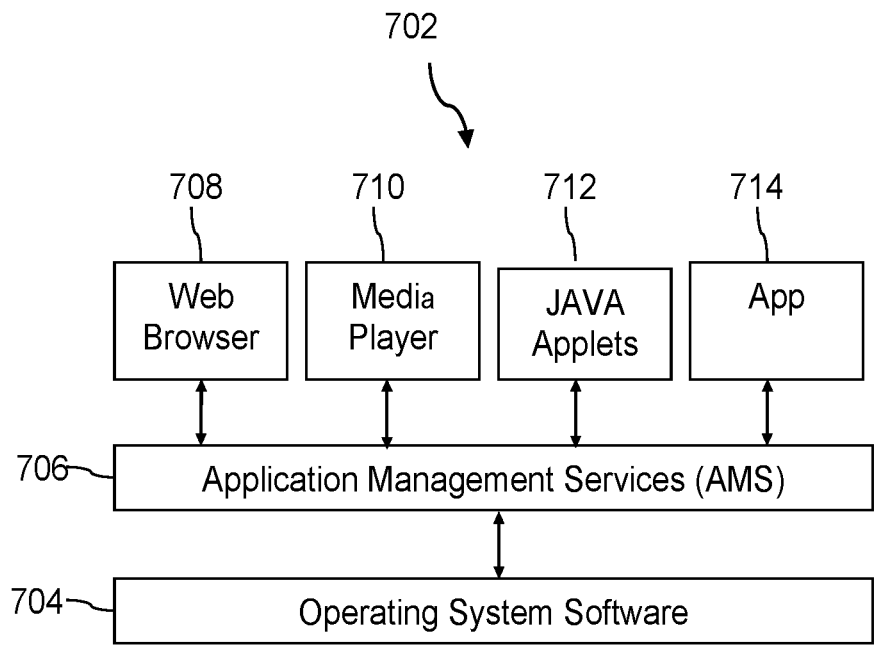
FIG. 7 is a block diagram of software architecture of a communication device according to an embodiment of the disclosure.

FIG. 7 illustrates a software environment 702 that may be implemented by the DSP 402. The DSP 402 executes operating system software 704 that provides a platform from which the rest of the software operates. The operating system software 704 may provide a variety of drivers for the handset hardware with standardized interfaces that are accessible to application software. The operating system software 704 may be coupled to and interact with application management services (AMS) 706 that transfer control between applications running on the UE 400. Also shown in FIG. 7 are a web browser application 708, a media player application 710, and JAVA applets 712. The web browser application 708 may be executed by the UE 400 to browse content and/or the Internet, for example when the UE 400 is coupled to a network via a wireless link. The web browser application 708 may permit a user to enter information into forms and select links to retrieve and view web pages. The media player application 710 may be executed by the UE 400 to play audio or audiovisual media. The JAVA applets 712 may be executed by the UE 400 to provide a variety of functionality including games, utilities, and other functionality.

Figure 8:
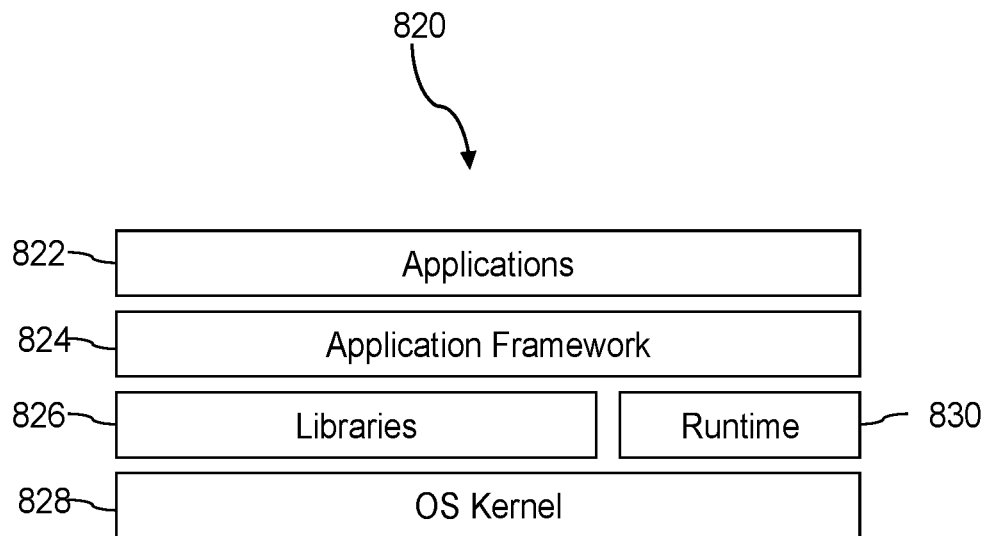
FIG. 8 is a block diagram of another software architecture of a communication device according to an embodiment of the disclosure.

FIG. 8 illustrates an alternative software environment 820 that may be implemented by the DSP 402. The DSP 402 executes operating system kernel (OS kernel) 828 and an execution runtime 830. The DSP 402 executes applications 822 that may execute in the execution runtime 830 and may rely upon services provided by the application framework 824. Applications 822 and the application framework 824 may rely upon functionality provided via the libraries 826.

Figure 9:
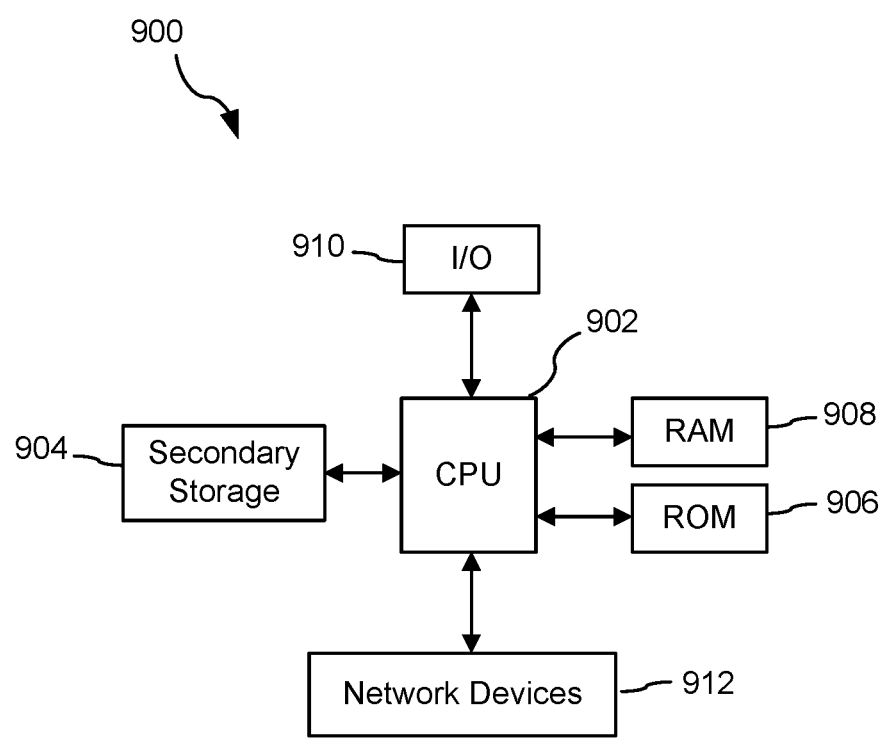
FIG. 9 is a block diagram of a computer system according to an embodiment of the disclosure.

FIG. 9 illustrates a computer system 900 suitable for implementing one or more embodiments disclosed herein. The computer system 900 includes a processor 902 (which may be referred to as a central processor unit (CPU)) that is in communication with memory devices including secondary storage 904, read-only memory (ROM) 906, random-access memory (RAM) 908, input/output (I/O) devices 910, and network connectivity devices 912. The computer system 900 may be UE 102, network access server 126, network proxy client 128, load balancer 129, DRA server 130, or AAA server 132. The processor 902 may be implemented as one or more CPU chips.

It is understood that by programming and/or loading executable instructions onto the computer system 900, at least one of the CPU 902, the RAM 908, and the ROM 906 are changed, transforming the computer system 900 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application-specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 900 is turned on or booted, the CPU 902 may execute a computer program or application. For example, the CPU 902 may execute software or firmware stored in the ROM 906 or stored in the RAM 908. In some cases, on boot and/or when the application is initiated, the CPU 902 may copy the application or portions of the application from the secondary storage 904 to the RAM 908 or to memory space within the CPU 902 itself, and the CPU 902 may then execute instructions that the application is comprised of. In some cases, the CPU 902 may copy the application or portions of the application from memory accessed via the network connectivity devices 912 or via the I/O devices 910 to the RAM 908 or to memory space within the CPU 902, and the CPU 902 may then execute instructions that the application is comprised of. During execution, an application may load instructions into the CPU 902, for example load some of the instructions of the application into a cache of the CPU 902. In some contexts, an application that is executed may be said to configure the CPU 902 to do something, e.g., to configure the CPU 902 to perform the function or functions promoted by the subject application. When the CPU 902 is configured in this way by the application, the CPU 902 becomes a specific purpose computer or a specific purpose machine.

The secondary storage 904 is typically comprised of one or more disk drives or tape drives and is used for non-volatile storage of data and as an over-flow data storage device if RAM 908 is not large enough to hold all working data. Secondary storage 904 may be used to store programs which are loaded into RAM 908 when such programs are selected for execution. The ROM 906 is used to store instructions and perhaps data which are read during program execution. ROM 906 is a non-volatile memory device which typically has a small memory capacity relative to the larger memory capacity of secondary storage 904. The RAM 908 is used to store volatile data and perhaps to store instructions. Access to both ROM 906 and RAM 908 is typically faster than to secondary storage 904. The secondary storage 904, the RAM 908, and/or the ROM 906 may be referred to in some contexts as computer readable storage media and/or non-transitory computer readable media.

I/O devices 910 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 912 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 912 may provide wired communication links and/or wireless communication links (e.g., a first network connectivity device 912 may provide a wired communication link and a second network connectivity device 912 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC) and radio frequency identity (RFID). The radio transceiver cards may promote radio communications using 5G, 5G New Radio, or 5G LTE radio communication protocols. These network connectivity devices 912 may enable the processor 902 to communicate with the Internet or one or more intranets. With such a network connection, it is contemplated that the processor 902 might receive information from the network, or might output information to the network in the course of performing the above-described method steps. Such information, which is often represented as a sequence of instructions to be executed using processor 902, may be received from and outputted to the network, for example, in the form of a computer data signal embodied in a carrier wave.

Such information, which may include data or instructions to be executed using processor 902 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 902 executes instructions, codes, computer programs, scripts which it accesses from hard disk, floppy disk, optical disk (these various disk-based systems may all be considered secondary storage 904), flash drive, ROM 906, RAM 908, or the network connectivity devices 912. While only one processor 902 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 904, for example, hard drives, floppy disks, optical disks, and/or other device, the ROM 906, and/or the RAM 908 may be referred to in some contexts as non-transitory instructions and/or non-transitory information.

In an embodiment, the computer system 900 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 900 to provide the functionality of a number of servers that is not directly bound to the number of computers in the computer system 900. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third-party provider. Some cloud computing environments may comprise cloud computing resources owned and operated by the enterprise as well as cloud computing resources hired and/or leased from a third-party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer-usable program code. The computer program product may be embodied in removable computer storage media and/or non-removable computer storage media. The removable computer readable storage medium may comprise, without limitation, a paper tape, a magnetic tape, magnetic disk, an optical disk, a solid-state memory chip, for example analog magnetic tape, compact disk read only memory (CD-ROM) disks, floppy disks, jump drives, digital cards, multimedia cards, and others. The computer program product may be suitable for loading, by the computer system 900, at least portions of the contents of the computer program product to the secondary storage 904, to the ROM 906, to the RAM 908, and/or to other non-volatile memory and volatile memory of the computer system 900. The processor 902 may process the executable instructions and/or data structures in part by directly accessing the computer program product, for example by reading from a CD-ROM disk inserted into a disk drive peripheral of the computer system 900. Alternatively, the processor 902 may process the executable instructions and/or data structures by remotely accessing the computer program product, for example by downloading the executable instructions and/or data structures from a remote server through the network connectivity devices 912. The computer program product may comprise instructions that promote the loading and/or copying of data, data structures, files, and/or executable instructions to the secondary storage 904, to the ROM 906, to the RAM 908, and/or to other non-volatile memory and volatile memory of the computer system 900.

In some contexts, the secondary storage 904, the ROM 906, and the RAM 908 may be referred to as a non-transitory computer readable medium or a computer readable storage media. A dynamic RAM embodiment of the RAM 908, likewise, may be referred to as a non-transitory computer readable medium in that while the dynamic RAM receives electrical power and is operated in accordance with its design, for example during a period of time during which the computer system 900 is turned on and operational, the dynamic RAM stores information that is written to it. Similarly, the processor 902 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for routing Diameter messages in a core network and for authenticating a wireless communication device according to the Diameter messages, comprising:
    at least one network access server configured to:
        send, to a back-end network node, subscription information of the at least one network access server in a first Diameter message, wherein the subscription information comprises attribute-value pairs (AVP) of the at least one network access server;
        receive, from a communication device, an authentication request;
        send, to a network node, a Transmission Control Protocol (TCP) connection request in a second Diameter message responsive to receiving the authentication request; and
        send the authentication request in a third Diameter message to a diameter routing Agent (DRA) for authenticating a subscriber identity module (SIM) card for multimedia services of the core network;
    the back-end network node coupled to the at least one network access server and to the DRA, wherein the back-end network node is configured to send, to the DRA in a fourth Diameter message, configuration information for pre-configuring the back-end network node at the DRA, and wherein the configuration information includes an Internet Protocol (IP) address of the back-end network node; and
    the DRA coupled to the back-end network node and configured to pre-configure the back-end network node based on the configuration information.

2. The system of claim 1, wherein when the back-end network node is configured as a firewall proxy, the firewall proxy is configured to:
    apply a subnet mask to a source IP address of a corresponding network access server of the at least one network access server; and
    generate an access list based on the subnet mask.

3. The system of claim 2, wherein the access list comprises a mapping of a source hostname of the corresponding network access server to a firewall proxy hostname of the firewall proxy.

4. The system of claim 2, wherein when the back-end network node is configured as the firewall proxy, the subscription information includes at least one of a source Internet Protocol (IP) address of the at least one network access server, a source hostname of the at least one network access server, or a realm of the at least one network access server.

5. The system of claim 1, wherein the back-end network node is configured as a firewall proxy, and wherein the at least one network access server is configured to send the TCP connection request when the at least one network access server is instantiated a first time.

6. The system of claim 1, wherein the back-end network node is configured as a load balancer, wherein the load balancer comprises at least one virtual server, and wherein the configuration information comprises a virtual Internet Protocol (IP) address of each virtual server of the at least one virtual server, random access memory (RAM) identifier of each network access server of the at least one network access server, and a hostname of the load balancer.

7. The system of claim 1, wherein when the back-end network node is configured as a load balancer, the subscription information comprises a source hostname of the at least one network access server, a realm of the at least one network access server, and a random access memory (RAM) identifier of each network access server of the at least one network access server.

8. The system of claim 1, wherein the authentication request is for authenticating the SIM card of the communication device for multimedia services of the core network.

9. A system for routing Diameter messages in a core network and for authenticating a wireless communication device according to the Diameter messages, comprising:
    at least one network access server configured to:
        send, to a firewall proxy in a first Diameter message, subscription information of the at least one network access server, wherein the subscription information comprises attribute-value pairs (AVP) of the at least one network access server;
        receive, from a communication device, an authentication request; and
        send, to a diameter routing agent (DRA) in a second Diameter message, a Transmission Control Protocol (TCP) connection request;
    the firewall proxy coupled to the at least one network access server and configured to:
        generate an access list based on the subscription information, wherein the access list includes a mapping of a source Internet Protocol (IP) address of a corresponding network access server of the at least one network access server to a firewall network address translation (NAT) IP address of the firewall proxy;
        send, to the DRA in a third Diameter message, configuration information for pre-configuring the firewall proxy at the DRA, wherein the configuration information includes the firewall NAT IP address of the firewall proxy; and
        send, to the at least one network access server, the access list; and
    the DRA coupled to the firewall proxy and configured to:
        pre-configure the firewall proxy based on the configuration information;
        receive, from the at least one network access server, the TCP connection request comprising the firewall NAT IP address in a fourth Diameter message; and
        send, to the at least one network access server, an acknowledgement that indicates confirmation of the TCP connection request.

10. The system of claim 9, wherein the firewall proxy is configured to:
    apply a subnet mask to the source IP address of the corresponding network access server; and
    generate the access list based on the subnet mask.

11. The system of claim 9, wherein the access list further comprises a mapping of a source hostname of the corresponding network access server to a firewall proxy hostname of the firewall proxy.

12. The system of claim 11, wherein the DRA is further configured to pre-configure the firewall proxy based on the firewall NAT IP address and the firewall proxy hostname.

13. The system of claim 9, wherein the firewall proxy is further configured to send the access list to the at least one network access server when the at least one network access server is included in the mapping.

14. The system of claim 9, wherein the authentication request is for authenticating a subscriber identity module (SIM) card of the communication device for multimedia services of the core network.

15. The system of claim 9, wherein the at least one network access server is configured to send the TCP connection request when the at least one network access server is instantiated a first time.

16. The system of claim 9, wherein the subscription information includes at least one of a source Internet Protocol (IP) address of the at least one network access server, a source hostname of the at least one network access server, or a realm of the at least one network access server.

17. A system for routing Diameter messages in a core network and for authenticating a wireless communication device according to the Diameter messages, comprising:
at least one network access server configured to:
send, to a load balancer, subscription information of the at least one network access server in a first Diameter message, wherein the subscription information comprises attribute-value pairs (AVP) of the at least one network access server;
receive, from a communication device, an authentication request;
send, to the load balancer, a Transmission Control Protocol (TCP) connection request in a second Diameter message responsive to receiving the authentication request; and
send the authentication request in a third Diameter message to a diameter routing Agent (DRA) for authenticating a subscriber identity module (SIM) card of the communication device for multimedia services of the core network;
the load balancer coupled to the at least one network access server and to the DRA, wherein the load balancer is configured to send, to the DRA in a fourth Diameter message, configuration information for pre-configuring the load balancer at the DRA; and
the DRA coupled to the load balancer and configured to pre-configure the load balancer based on the configuration information.

18. The system of claim 17, wherein the load balancer comprises at least one virtual server, wherein each virtual server of the at least one virtual server comprises a virtual Internet Protocol (IP) address, and wherein the load balancer is further configured to:
receive, from the at least one network access server, a first TCP connection request, wherein the first TCP connection request comprises a source IP address of the at least one network access server, a destination IP address as a first VIP address of the load balancer, and a RAM identifier; and
send, to the DRA, a second TCP connect request in response to receiving the first TCP connection request.

19. The system of claim 17, wherein the subscription information comprises a source hostname of the at least one network access server, a realm of the at least one network access server, and a random access memory (RAM) identifier of each network access server of the at least one network access server.

20. The system of claim 17, wherein the load balancer comprises at least one virtual server, and wherein the configuration information comprises a virtual Internet Protocol (IP) address of each virtual server of the at least one virtual server, random access memory (RAM) identifier of each network access server of the at least one network access server, and a hostname of the load balancer.

* * * * *